United States Patent Office 2,944,097
Patented July 5, 1960

2,944,097

PROCESS FOR ISOMERIZING LIGHT STRAIGHT CHAIN PARAFFINS

William C. Starnes, Winfield Township, Butler County, and Robert C. Zabor, Shaler Township, Allegheny County, Pa., assignors to Gulf Research & Development Company, Pittsburgh, Pa., a corporation of Delaware No Drawing. Filed Dec. 31, 1957, Ser. No. 706,233

3 Claims. (Cl. 260—683.65)

This invention relates to a process for hydroisomerizing light straight chain paraffins in the presence of a supported platinum catalyst. More particularly, it relates to hydroisomerizing such light normal paraffins while introducing a halogen to the reaction zone.

The conversion of light straight chain paraffins to their branched chain isomers has great importance in the petroleum and chemical industries. It is important in petroleum refining, because branched chain paraffins of the gasoline boiling range have higher octane ratings than their straight chain isomers. The branched chain isomers are also valuable as chemical intermediates. For example, isobutane is used in the alkylation process to produce branched heptanes and octanes, and isopentane is used in the production of isoprene.

In our patent application, Serial No. 508,980, filed May 17, 1955, now U.S. Patent No. 2,831,908, we have described a valuable new method for isomerizing n-paraffins. This method is based on the discovery that the space-time-yield of branched chain isomers is remarkably high when the normal paraffin is contacted with a platinum-alumina catalyst at an elevated temperature and pressure, at a space velocity of above 5 liquid volumes of hydrocarbon per volume of catalyst per hour and a low concentration of hydrogen such that the mol fraction of hydrocarbon in the hydrocarbon-hydrogen feed mixture is above 0.5, and above 0.7 for superior space-time-yields, but below the hydrocarbon concentration of about 0.9 mol fraction which causes rapid deactivation of the catalyst. We use the term "space-time-yield of branched chain isomer" in its usual sense as meaning the volume of isoparaffin produced per hour per volume of catalyst. This is an important characteristic of the process commercially because it indicates the amount of the desired product that can be produced in a reactor of a given size in a particular period of time. The process is also characterized by high efficiency in terms of the ratio of isoparaffin yield to total yield of conversion product.

Our present invention is based on the discovery that the selectivity and activity of the platinum-alumina type of catalyst for catalyzing the isomerization of light normal paraffins to their branched chain isomers can be markedly improved and maintained for a long continuous operation by introducing a small amount of a volatile halogen-containing material to the reaction zone while charging a paraffinic feed stock of low or negligible naphthene content under our hydroisomerization conditions, including high temperature and pressure, high space velocity and very low hydrogen concentration.

The process of the invention in general comprises contacting with a platinum-alumina catalyst at a temperature from 600° to 900° F. and a pressure above 375 pounds per square inch gauge, a hydrocarbon feed stream in admixture with hydrogen and a volatile source of halogen in a concentration supplying from 10 to 150 parts by weight of elemental halogen per million parts of hydrocarbon. At least 90% of the hydrocarbon feed consists of straight chain or slightly branched paraffins having from 5 to 7 carbon atoms in the molecule. The hydrogen concentration corresponds to a mol fraction of hydrocarbon greater than 0.5 but is less than the concentration corresponding to rapid catalyst aging. The process yields a conversion product of substantially the same average molecular weight as the feed, and at least 90 percent of the total conversion is paraffin isomerization. Hydrogen is neither consumed nor produced in large amount by the process and the product contains substantially no higher concentration of aromatics than the feed.

We have indicated that an important benefit is obtained by the addition of a small amount of a volatile halogen-containing material to the hydroisomerization reaction carried out under our conditions, including a low hydrogen concentration. Thus, as compared with reforming processes which treat naphthenic fractions principally to accomplish aromatization and hydrocracking and which normally employ hydrogen concentrations from 3,000 to 20,000 standard cubic feet of hydrogen per barrel of hydrocarbon (equal to about 0.27 to 0.04 mol fraction of hydrocarbon, in the case of pentane) our process uses a low hydrogen concentration such that the mol fraction of hydrocarbon in the hydrocarbon-hydrogen charge is greater than 0.5, and greater than 0.7 for superior space-time-yields of branched chain paraffins, but below about 0.9. The hydrogen for our process can be obtained from an impure stream of hydrogen. A stream which we have found produces excellent results consists essentially of about 80 mol percent hydrogen and 20 mol percent $C_1$–$C_4$ hydrocarbons.

As we have also indicated, we employ the halogen addition technique in our process with the use of a high space velocity of the charge. By high space velocity we mean liquid-hourly space velocities that are conventionally not considered practicable for satisfactory conversion in naphtha reforming processes. More particularly, we mean space velocities above 5 liquid volumes of hydrocarbon per volume of catalyst per hour. Preferably, our process uses space velocities above 8 vol./vol./hr. and we can use considerably higher space velocities, for example, 25 vol./vol./hr. or higher and still obtain good conversions.

The catalyst for our process is composed of platinum supported on alumina. The platinum content is from 0.1 to 5.0 percent by weight and preferably is from 0.2 to 1.0 percent by weight. The rest of the catalyst is substantially entirely alumina, although a small amount of chlorine may be present. For example, a small amount of chlorine will be incorporated if the catalyst is prepared by deposition of the platinum from a solution of chloroplatinic acid. A small amount of silica can be present as a stabilizer for the alumina. The catalyst can be in the form of irregular granules or of particles of uniform size and shape prepared by pilling, extrusion or other suitable methods. Specific catalyst compositions suitable for the process are described hereinafter.

The high space-time-yield of isoparaffin that characterizes our process can be obtained at moderate reaction temperatures. The addition of halogen makes it possible to employ a lower temperature than would be necessary for the same conversion or space-time-yield if the process were carried out in the absence of halogen. Our process operates in the temperature range of 600 to 900° F. However, the best relationship of high conversion and long catalyst life is obtained in the range from 700 to 850° F. Within the above ranges the reaction temperature for any particular run will be selected according to the activity of the particular catalyst and the degree of conversion desired. Normally, the temperature will be raised periodically as the catalyst activity gradually declines.

A high reaction pressure is an important element of our process. The pressure must be above 375 pounds per square inch gauge (abbreviated hereinafter as p.s.i.g.). We obtain superior results in the pressure range from 400 to 600 p.s.i.g. The use of such high pressures in combination with the other elements of our process, including low hydrogen concentration, high space velocity, use of a platinum-alumina catalyst and the addition of halogen is necessary to obtain the long catalyst life and high rate of isomerization that characterize our process.

We have said that the feed stream for our process consists of a hydrocarbon fraction, hydrogen and a small amount of a volatile source of halogen. An essential feature of the process is that at least 90 volume percent of the hydrocarbon fraction consists of aliphatic paraffins having 5 to 7 carbon atoms. Our process is concerned with isomerizing the low octane number aliphatic paraffins having from 5 to 7 carbon atoms in the molecule, to their isomers of higher octane rating. This involves isomerizing n-pentane and the low octane number hexanes and heptanes to their branched chain isomers of higher octane rating. By "low octane number hexanes" we mean n-hexane and the slightly branched hexanes 2-methylpentane and 3-methylpentane. These latter can be isomerized to the more highly branched dimethylbutanes which are of higher octane number. By "low octane number heptanes" we mean n-heptane and the singly branched heptanes such as 2-methylhexane and 3-methylhexane. These can be isomerized to the more highly branched heptanes of higher octane ratings such as the dimethylpentanes and 2,2,3-trimethylbutane, which is also known as triptane. An essential feature of our process, as we will show more fully by example hereinafter, is that the charge stock is low in naphthene and aromatics content. As stated in the definition above, at least 90 percent of the hydrocarbon fraction consists of aliphatic paraffins. Thus, a small concentration of naphthenes or aromatics having boiling points close to those of the isomerizable n-paraffins can be tolerated. For example, a hexane fraction charged to our process can contain a total of as much as 10 percent cyclohexane, benzene and methylcyclopentane. However, a concentration of cyclic hydrocarbons in the hydrocarbon fraction greater than about 10 volume percent is deleterious and makes it impossible to obtain the full benefits of the addition of halogen to the hydroisomerization zone in accordance with our process.

The hydrocarbon charge stock for our process can be a substantially pure fraction of n-pentane, n-hexane or n-heptane or it can be a refinery fraction predominating in one of these n-paraffins and containing minor amounts of other hydrocarbons of similar boiling points. It can also be a mixture of two or more of these n-paraffins or of fractions predominating therein. Most suitably, the charge stock is a refinery fraction that consists largely of one or more of the mentioned n-paraffins plus minor amounts of other hydrocarbons of similar boiling range that would normally be present in light, straight run petroleum fractions, or in natural gasoline fractions, or in n-pentane, n-hexane or n-heptane fractions recovered from the product of a conversion process such as catalytic reforming. A fraction which is particularly suitable for our process is a refinery n-pentane fraction which contains 85 volume percent or more n-pentane and the rest consisting essentially of other open chain paraffins. Such a fraction could contain minor amounts of isopentane (e.g., 8 percent), isohexanes (e.g., 7 percent), cyclopentane (e.g., 1 percent), and pentenes (e.g., 1 percent). For all of the possible charge stocks the essential feature is that at least 90 percent of the charge consists of aliphatic paraffins of no more than 7 carbon atoms. The charge thus has a negligible or low content of naphthenes and aromatics.

As we have said, halogen is introduced into the reaction zone in the form of a volatile halogen-containing material. This must be a material that vaporizes and yields free halogen or hydrogen halide under the reaction conditions. Some substances, for example, sulfur and nitrogen are undesirable in the reaction zone. Halogen compounds containing these materials should not be used and the halogen-containing material should be selected from the group consisting of free halogens, hydrogen halides and hydrocarbon halides that vaporize under the process conditions. We prefer chlorine compounds, for example hydrogen chloride or hydrocarbon chlorides, preferably an alkyl chloride such as t-butyl chloride, propylene dichloride, etc. Although not necessarily equivalents, other halogens can produce comparable improvements in catalyst activity. Thus, alkyl bromides, fluorides and iodides can be used in lieu of the chlorides. A very small concentration of halogen in the reaction zone produces the desired results. When using chlorine as the added halogen an amount of the halogen-containing material sufficient to provide about 10 to 50 parts by weight of elemental chlorine per million parts of hydrocarbon should normally be used. Concentrations of chlorine substantially above 50 parts per million can cause deactivation of the catalyst and contamination of the product. However, under certain conditions, e.g., with a low reaction temperature or when using a catalyst of low activity, a higher concentration of chlorine may be satisfactory. The other halogens can be used in other ranges of weight proportions with the hydrocarbon charge. Thus, bromine and iodine, being of higher atomic weight than chlorine, can be used in higher weight ratios with the hydrocarbon and fluorine can produce similar results when used in lower weight ratios than indicated for chlorine. However, for any of the halogens a concentration greater than 150 parts by weight of elemental halogen per million parts of hydrocarbon should not be used. If a concentration greater than this is used in combination with the other elements of our process the disadvantages of halogen addition outweigh its advantages.

A concentration of the halogen compound sufficient to provide the proper concentration of elemental halogen is introduced into the reaction zone. One method of introducing the halogen is by adding a dilute solution of the hydrocarbon halide to the liquid hydrocarbon feed stock. Alternatively, a gaseous halogen, hydrogen halide or hydrocarbon halide can be added to the hydrogen stream or otherwise introduced into the reaction zone.

The examples below describe various procedures in converting a paraffinic feed in the presence of a platinum-alumina catalyst, including the process of our invention and other procedures. The examples demonstrate advantages of our process as compared with other procedures and the importance of essential features of our process.

In the examples two types of platinum-alumina catalysts were used, both of which were stationary fixed bed catalysts. Their characteristics are given in Table I.

TABLE I

*Catalyst characteristics*

| | Catalyst A | Catalyst B |
|---|---|---|
| Shape | Rods | Lumps. |
| Diameter | <0.066 in. | 10-16 mesh. |
| Packed Density, Gm./Cc | 0.83 | |
| Analysis: | | |
| Surface Area, M$^2$/Gm | 296 | 266. |
| Platinum, Percent by Wt | 0.57 | 0.78. |
| Chlorine, Percent by Wt | 0.6 | 0.3. |
| Total Sulfur, Percent by Wt | 0.06 | |
| SiO$_2$, Percent by Wt | <0.01 | 0.25. |
| Iron, Percent by Wt | 0.0007 | |
| Al$_2$O$_3$, Percent by Wt | Balance | 99.05. |

Certain of the examples describe the charging of refinery n-pentane fractions. These fractions were substantially of the type defined in Table II.

TABLE II

*Pentane fraction*

Composition, percent by vol.:
| | |
|---|---|
| Isopentane | 7–9 |
| n-Pentane | 88–92 |
| Pentenes | 1–2 |
| Cyclopentane | 0–1 |
| 2,2-dimethylbutane | 0–1 |
| 2,3-dimethylbutane | 0–1 |

Inspections:
| | |
|---|---|
| Sulfur, p.p.m. | 30 |
| Knock rating—Research Method: Octane No.— | |
| Clear | 64 |
| +3 cc. TEL | 87 |
| Water (after drying), p.p.m.[1] | 10–30 |

[1] P.p.m.=parts by weight per million parts of hydrocarbon.

EXAMPLE 1

A refinery n-pentane fraction of the type defined in Table II was charged to a fixed bed reactor containing a platinum-alumina catalyst having substantially the composition of Catalyst A in Table I. Hydroisomerization conditions were employed including moderate temperature, a high space velocity of 9 volumes of hydrocarbon per hour per volume of catalyst and a low hydrogen concentration corresponding to 0.75 mol fraction hydrocarbon in the reactor charge. The reactor pressure was held at 400 p.s.i.g. The hydrogen-containing gas contained about 80 mol percent hydrogen, about 18 mol percent methane and the balance ethane and heavier hydrocarbons. The run was carried out in two phases. In Phase I the hydrocarbon feed was charged free of halogen and in Phase II t-butyl chloride was charged continuously with the reactor feed. In Phase I after an initial break-in period of 250 throughput (i.e., after having charged 250 liquid volumes of hydrocarbon per volume of catalyst) the catalyst reached a substantially constant activity. The temperature was 790° F. and the conversion level was 22.2 percent, expressed as the mol percentage of isopentane in the total hydrocarbon product based on the hydrocarbon content of the charge. After this phase of charging the n-pentane fraction free of halogen Phase II of the run began. In Phase II the average temperature was again 790° F. and t-butyl chloride was added to the pentane feed in an amount sufficient to produce a concentration of 50 parts by weight of elemental chlorine per million parts of liquid hydrocarbon. After a throughput of about 600 volumes of hydrocarbon per volume of catalyst the activity of the catalyst lined out and the concentration of isopentane in the product was 55.1 percent as compared with the conversion of about 22.2 percent which was obtained without the addition of chloride. These results show the marked increase in activity of the catalyst for converting n-pentane to isopentane when halogen is added under the conditions of our process.

The technique of adding a chlorine compound has been employed in the well-known procedure of reforming naphthenic naphthas over a platinum-alumina catalyst. We have carried out a run charging n-pentane under conventional reforming conditions and have added chlorine to the feed in accordance with the reforming technique. This operation and its results are described in Example 2.

EXAMPLE 2

The n-pentane charge stock and the platinum-alumina catalyst was substantially as described in Example 1. The reforming conditions were as follows: reactor outlet temperature, 850° F.; reactor pressure, 400 p.s.i.g.; liquid-hourly-space velocity, 4.0 volumes per hour per volume; and hydrogen concentration, 3500 s.c.f./bbl. of hydrocarbon. In the first phase of the run the n-pentane fraction was charged without added chloride. Even at the mild reforming conditions employed, hydro-cracking was severe. Following the period of operation without the addition of chloride, t-butyl chloride was added to the feed to provide a concentration of 50 parts by weight of chlorine per million parts of hydrocarbon. The process became inoperable. Hydrocracking was excessive and the temperature rose uncontrollably. The addition of chloride to the paraffinic feed stock under these conditions increased the catalyst activity so greatly, without increasing its selectivity for hydroisomerization, that the process was inoperable.

We have carried out another operation with less severe conditions than those of Example 2 to reduce the degree of hydrocracking of the charge and have observed the effect of adding chloride to the feed under the mild conditions. The procedure and results are described in the following example.

EXAMPLE 3

This run employed the same type of platinum-alumina catalyst and pentane charge stock as described in Example 1. The reaction conditions were conditions that have been described in the literature as suitable for the isomerization of n-pentane. (Article by Haensel et al., Industrial and Engineering Chemistry, volume 43, page 2102.) The conditions included a reactor outlet temperature of 800° F., a pressure of 950 p.s.i.g., a liquid-hourly-space velocity of 1.0 volume per volume per hour and a hydrogen concentration of 3500 s.c.f./bbl. of hydrocarbon. Following a break-in period the n-pentane fraction was charged to the fixed bed reactor at the above conditions without the addition of chloride. After a throughput of about 80 volumes of hydrocarbon per volume of catalyst, t-butyl chloride was added to the feed in an amount sufficient to provide a concentration of about 50 parts of chlorine per million parts of hydrocarbon. The results are given in Table III. They show that the isopentane yield during the first phase of the example was reasonably high, namely, about 37.7 mol percent of the charge. However, the space-time-yield of isopentane was less than 0.4 volume of isopentane per volume of catalyst per hour as compared with a space-time-yield of isopentane of 4.7 in Phase II of Example 1, carried out in accordance with our process. Phase II of the present example shows no advantage for the addition of chlorine to the feed. Gasification was extensive in Phase I but in Phase II when chloride was added, gasification increased so greatly that the total production of $C_1$-$C_4$ hydrocarbons amounted to 13.8 mol percent of the charge. This is an increase of over 8 mols of gaseous hydrocarbon per 100 mols of charge. By contrast, less than 1.8 mols of $C_1$-$C_4$ hydrocarbons per 100 mols of charge were produced when halogen was added to the feed in the process of our invention as described in Phase II of Example 1. The results of Example 3 show that the increase in activity resulting from halide addition to the process carried out under the prior art isomerization conditions, causes an excessively large increase in hydrocracking. In the process of our invention the hydrocracking is controlled and the increase in activity obtained by addition of a small critical concentration of chlorine is directed specifically toward the formation of the desired branched chain isomers of the charge.

The next example describes a run which demonstrates the importance in our process of charging a paraffinic feed that contains only a low or negligible concentration of cyclic hydrocarbons.

EXAMPLE 4

Catalyst A of Table I was used. The run began with a break-in period using as the feed the substantially naphthene-free n-pentane fraction of Table II. The initial reaction conditions were hydroisomerization conditions substantially as used in Examples 1 and 2. After the break-in period, which lasted for a throughput of 220 volumes of hydrocarbon per volume of catalyst, the feed stock was changed to a blend of the n-pentane fraction containing about 22 mol percent cyclohexane. Extensive endothermic dehydrogenation occurred with this charge and a considerable drop in catalyst temperature occurred in the inlet part of the catalyst bed. Therefore, the outlet temperature was raised from 790° F. to about 800° F. When the naphthene-containing feed was charged there was also observed an inhibition effect which reduced the conversion of n-pentane. In the next phase of the run, t-butyl chloride was added to the naphthene-containing feed in a concentration corresponding to 50 parts per million of chlorine. Gradual promotion of the catalyst was obtained and a gain in conversion resulted. However, despite the higher outlet temperature the maximum isopentane yield was lower than in Phase II of Example 1 which was carried out under similar conditions but with a substantially naphthene-free charge. As shown in Table III the isopentane content of the total product during the halogen addition phase of this example was only 34.9 mol percent as compared with 55.1 mol percent in the halogen addition phase of Example 1. The space-time-yield of isopentane was only 2.74 volume per volume per hour as compared with 4.7 in the halogen addition phase of Example 1.

The specific operating conditions and results for Examples 1, 3 and 4 are tabulated in Table III.

product sample contained 33.1 mol percent isopentane and after a throughput of 42 the product contained 43.6 mol percent isopentane. This run was of a short duration and was discontinued before the conversion had risen to a steady state. Furthermore, the bromine was added to the charge in a concentration higher than should be used for long catalyst life, although bromine, having an atomic weight about twice that of chlorine can be used in a weight ratio with the hydrocarbon about twice the weight ratio used for chlorine, with similar results being obtained. In spite of this, the results show the beneficial effect of adding an alkyl bromide to the pentane charge. They show an increasing concentration of isopentane in the product. The maximum yield of isopentane had not been reached when the process was discontinued.

The example below describes the application of our process to the isomerization of an n-hexane fraction.

EXAMPLE 6

The charge stock was a hexane fraction having the following approximate volume percentage composition: n-hexane, 85.7 percent; 2,3-dimethylbutane and 2-methylpentane, 1.7 percent; 3-methylpentane, 7.1 percent; methylcyclopentane, 2.9 percent; and benzene 2.6 percent. This fraction was charged with hydrogen to a fixed bed reactor containing a platinum-alumina catalyst of the type of

TABLE III

| Example | 1 | | 3 | | 4 | |
|---|---|---|---|---|---|---|
| Charge stock (n-pentane fraction) | Dried n-pentane fraction | | Dried n-pentane fraction | | Dried n-pentane fraction with 21.7 Mol percent Cyclohexane | |
| Phase | I | II | I | II | I | II |
| Chloride, p.p.m. | 0 | 50 | 0 | 50 | 0 | 50 |
| Reactor Outlet Temp., °F | 790 | 790 | 806 | 811 | 800 | 800 |
| Pressure, p.s.i.g | 400 | 400 | 950 | 950 | 400 | 400 |
| Space Velocity, Vol./Hr./Vol | 9.0 | 9.0 | 1.0 | 1.0 | 9.0 | 9.0 |
| Hydrogen/Hydrocarbon Ratio, s.c.f./bbl | 385 | 385 | 3,498 | 3,492 | 385 | 385 |
| Hydrocarbon Mol Fraction in Feed | 0.75 | 0.75 | 0.25 | 0.25 | 0.75 | 0.75 |
| Product Composition, Total | 100.6 | 100.5 | 102.5 | 106.6 | 102.6 | 101.7 |
| Mol percent of Charge: | | | | | | |
| Total C₁–C₄ | 0.9 | 1.8 | 5.7 | 13.8 | 0.9 | 1.1 |
| Methane | 0.5 | 0.3 | 1.7 | 4.9 | 0.2 | 0.2 |
| Ethane | 0.2 | 0.3 | 1.3 | 2.3 | 0.3 | 0.2 |
| Propane | 0.1 | 0.6 | 0.9 | 2.0 | 0.3 | 0.4 |
| Butane | 0.1 | 0.6 | 1.8 | 4.6 | 0.1 | 0.3 |
| Isopentane, 4.3 | 22.2 | 55.1 | 37.7 | 51.3 | 8.5 | 34.9 |
| n-Pentane, 91.8 | 74.6 | 39.5 | 57.0 | 39.9 | 66.7 | 43.5 |
| Cyclopentane, 0.8 | 0.5 | 1.1 | 0.5 | 0.3 | 0.8 | 0.8 |
| Pentanes plus Hexanes, 3.2 | 2.3 | 3.1 | 1.6 | 1.3 | 2.0 | 2.8 |
| Cyclohexane | | | | | 1.5 | 0.9 |
| Methylcyclopentane | | | | | 2.6 | 7.8 |
| Benzene | | | | | 19.6 | 9.7 |
| Space-Time-Yield of Isopentane, Vol./Hr./Vol | 1.65 | 4.66 | 0.34 | 0.48 | 0.48 | 2.74 |

In the examples above the halogen compound added to the isomerization feed has been a chlorine compound. However, as we have said, the process of our invention extends to the use of other halogen compounds. The example below describes the use of another halogen compound, namely, an alkyl bromide.

EXAMPLE 5

Pure grade n-pentane containing t-butyl bromide in a concentration corresponding to 145 parts by weight of bromine per million parts of hydrocarbon was charged to a fixed bed reactor containing a catalyst similar to Catalyst B of Table I. The reaction conditions included a temperature of 800° F., pressure of 500 p.s.i.g., a liquid-hourly space velocity of 16.8 vol./vol./hr. and a hydrogen concentration corresponding to a hydrocarbon mol fraction of 0.7. The product collected shortly after beginning to charge the halogen-containing n-pentane contained 25.5 mol percent isopentane. After a throughput of 17 liquid volumes of hydrocarbon per volume of catalyst the Catalyst B in Table I. During initial phases of the run variations were made in temperature, space velocity and hydrogen concentration. After the catalyst had been on stream for an age of about 34.4 barrels of hydrocarbon per pound of catalyst the reaction conditions included a liquid-hourly space velocity of 6.0 vol./vol./hr., a hydrogen concentration corresponding to a mol fraction hydrocarbon of 0.505, a pressure of 400 p.s.i.g., a temperature of 800° F. and no halogen was introduced with the charge. The yield of stabilized liquid reactor effluent amounted to about 98 weight percent of the reactor charge. The stabilized liquid product contained about 0.9 volume percent 2,2-dimethylbutane; about 20.3 percent 2,3-dimethylbutane and 2-methylpentane; 14.5 percent 3-methylpentane; 57.8 percent n-hexane; 2.6 percent methylcyclopentane; and 3.9 percent benzene. Thereafter, t-butyl chloride was added to the charge in an amount sufficient to provide a concentration of 50 parts by weight of chlorine per million parts of hydrocarbon. The conversion rose markedly. As the same reaction conditions as employed during the preceding operation period without halogen addition the content of branched chain hexanes in the stablized liquid product rose from about 35.7 volume percent to about 46.0 volume percent. More specifically, the liquid product contained 1.2 percent 2,2-dimethylbutane; 27.4 percent 2,3-dimethylbutane and 2-methylpentane; 17.4 percent 3-methylpentane; 48.2 percent n-hexane; 1.7 percent methylcyclopentane; and 4.1 percent benzene. The yield of liquid reactor effluent was still about 98 weight percent of the reactor charge. There was substantially no net consumption nor production of hydrogen during the run. These results show that the addition of a very small amount of chloride to the hexane reactor charge markedly increases the selectivity of production of branched chain hexanes under our reaction conditions.

The pentane isomerization runs described in the above examples were bench scale runs of rather short duration. The example which follows describes a pentane isomerization carried out in an adiabatic pilot plant unit in a run of long duration at high conversion level and typifies continuous commercial operation.

EXAMPLE 7

In this run the platinum-alumina Catalyst B of Table I was used. The catalyst had previously been used for isomerizing n-pentane and had been once regenerated by burning off carbonaceous deposits. The charge stock was a pentane fraction similar to that of Table I. During an initial period of the run, the pentane fraction was charged without the addition of chloride. At a catalyst age of about 7.7 barrels of hydrocarbon per pound of catalyst or 2200 volumes of liquid hydrocarbon per volume of catalyst the reactor temperature was 845° F., the conversion was at a level corresponding to about 47 percent isopentane in the stabilized liquid product and the catalytic activity was decreasing at a rate of about 1.7 percent decrease in conversion per barrel of hydrocarbon per pound of catalyst. At this point the temperature was lowered to 800° F. and t-butyl chloride in a concentration amounting to 50 p.p.m. of chloride was added to the hydrocarbon feed. The conversion decreased for a brief period and thereafter rose substantially above the conversion observed before the addition of chloride. During this phase, the catalyst aged at an average rate not exceeding about 1.7 percent decrease in conversion per barrel per pound. After a total catalyst age of 22 barrels of hydrocarbon per pound of catalyst or 6280 volumes of liquid hydrocarbon per volume of catalyst the conversion was still at a level of about 53 percent isopentane in the stabilized liquid product.

The results of this run show the advantage of adding a small amount of chloride to the pentane feed in the platinum-alumina catalysed hydroisomerization process carried out under our conditions in a commercial-type operation. They show that the addition of a small amount of chloride to the pentane feed that contains no more than a small content of cyclics makes it possible to operate at a mild temperature and obtain a high rate of conversion for a long catalyst life when operating at high space velocity, high pressure and low hydrogen concentration in accordance with our invention. More specifically, Example 7 shows that in pentane isomerization by our process it is possible to operate at a high level of conversion, corresponding to a product isopentane content of at least 50 percent of the total pentane content of the product, with a catalyst that has been on-steam without regeneration for an age or throughput of greater than 20 barrels of hydrocarbon per pound of catalyst.

Obviously many modifications and variations of the invention as hereinbefore set forth may be made without departing from the spirit and scope thereof and therefore only such limitations should be imposed as are indicated in the appended claims.

We claim:

1. A process which comprises contacting with a platinum-alumina catalyst a feed stream consisting of a hydrocarbon fraction, hydrogen and a volatile halogen-containing material selected from the group consisting of free halogens, hydrogen halides and hydrocarbon halides, at least 90 percent of said hydrocarbon fraction consisting of aliphatic paraffins having 5 to 7 carbon atoms, at a temperature from 600° to 900° F., at a pressure of 375 to 600 pounds per square inch gauge, at a liquid hourly space velocity greater than 5 volumes of hydrocarbon per volume of catalyst per hour and with a hydrogen concentration less than the concentration corresponding to a mol fraction of hydrocarbon of 0.5 but greater than the hydrogen concentration corresponding to rapid catalyst aging, the concentration of said halogen-containing material in the feed corresponding to 10 to 150 parts by weight of halogen per million parts of hydrocarbon, and recovering a conversion product of substantially the same average molecular weight as the hydrocarbon feed.

2. A process which comprises contacting with a platinum-alumina catalyst a feed stream consisting of a hydrocarbon fraction, hydrogen and an alkyl chloride, at least 90 percent of said hydrocarbon fraction consisting of aliphatic paraffins having 5 to 7 carbon atoms, at a temperature from 600° to 900° F., a pressure of 375 to 600 pounds per square inch gauge, at a liquid-hourly space velocity greater than 5 volumes of hydrocarbon per volume of catalyst per hour, and with a hydrogen concentration less than the concentration corresponding to a mol fraction of hydrocarbon of 0.5 but greater than the hydrogen concentration corresponding to rapid catalyst aging, the concentration of said alkyl chloride in the feed corresponding to about 10 to 50 parts by weight of chlorine per million parts of hydrocarbon, and recovering a conversion product of substantially the same average molecular weight as the hydrocarbon feed.

3. A process which comprises contacting with a platinum-alumina catalyst a feed stream consisting of a hydrocarbon fraction, hydrogen and an alkyl chloride, said hydrocarbon fraction containing at least 85 volume percent n-pentane and the rest consisting essentially of other open chain paraffinic hydrocarbons, at a temperature from 600° to 900° F., at a pressure from 400 to 600 pounds per square inch gauge, at a liquid hourly space velocity greater than 8 volumes of hydrocarbon per volume of catalyst per hour and with a hydrogen concentration less than the concentration corresponding to a mol fraction of hydrocarbon of 0.7 but greater than the hydrogen concentration corresponding to rapid catalyst aging, the concentration of said alkyl chloride in the feed corresponding to about 10 to 50 parts by weight of chlorine per million parts of hydrocarbon, and recovering a conversion product of substantially the same average molecular weight as the hydrocarbon feed and having an isopentane content of at least 50 percent of the total pentane content of the product.

References Cited in the file of this patent
UNITED STATES PATENTS

| | | |
|---|---|---|
| 2,798,105 | Heinemann et al. | July 2, 1957 |
| 2,831,908 | Starnes et al. | Apr. 22, 1958 |